United States Patent [19]

Sakata

[11] Patent Number: 5,209,065
[45] Date of Patent: May 11, 1993

[54] HEAT ENGINE UTILIZING A CYCLE HAVING AN ISENTHALPIC PRESSURE-INCREASING PROCESS

[76] Inventor: Toyoshi Sakata, 128 Nojiri, Shikata-cho, Kakogawa 675-03, Japan

[21] Appl. No.: 911,247

[22] Filed: Jul. 6, 1992

Related U.S. Application Data

[63] Continuation of Ser. No. 694,230, May 1, 1991, abandoned.

[30] Foreign Application Priority Data

May 8, 1990 [JP] Japan .................................. 2-119340

[51] Int. Cl.[5] ............................................... F02C 1/04
[52] U.S. Cl. ....................................... 60/650; 60/682; 60/649
[58] Field of Search ........................ 60/650, 682, 649

[56] References Cited

U.S. PATENT DOCUMENTS 2,621,481 12/1952 Bowden .

FOREIGN PATENT DOCUMENTS 3515560 10/1985 Fed. Rep. of Germany .
2412692 7/1979 France .

Primary Examiner—Allen M. Ostrager
Attorney, Agent, or Firm—Marshall, O'Toole, Gerstein, Murray & Bicknell

[57] ABSTRACT

A heat engine utilizing a cycle having an isenthalpic pressure-increasing phase wherein, in the entropy-reduction phase of the cycle for changing the state of the working fluid, in order to have at least a part of that phase change at constant enthalpy, a compensating fluid (high-pressure feed) at a pressure higher than that of the cycle working fluid is introduced into the cycle system at the beginning of the isenthalpic change, thus increasing the pressure of the working fluid, and then the entropy of the working fluid is reduced by discharging a part of the working fluid to the outside of the cycle system at the end of the isenthalpic change.

1 Claim, 3 Drawing Sheets

HEAT ENGINE UTILIZING A CYCLE HAVING AN ISENTHALPIC PRESSURE-INCREASING PROCESS

This application is a continuation of application Ser. No. 07/694,230, filed May 1, 1991, now abandoned.

FIELD AND BACKGROUND OF THE INVENTION

This invention relates to a heat engine based on an improved cycle in which, of the various phases which comprise the thermodynamically functioning cycle; changes are made in the reduction method of the entropyreduction phase for the purpose of improving the heat efficiency of the cycle used in a heat engine or cold generating device.

As is well known, the operating cycle of internal combustion engines and other types of heat engines, for example the Carnot cycle which displays the highest level of efficiency, is comprised of four changing phases consisting of isothermal changes and adiabatic changes between the high-heat source (temperature $T_1$ (° K)) and the low-heat source (temperature $T_2$ (° K)).

Although an entropy-reduction phase is included in part of the phases of the Carnot cycle, in this phase it is necessary to compress the working fluid and discharge some of the heat of the working fluid to the outside of the cycle system. For this reason, in the prior art, a heat source of a temperature lower than that of the low-temperature part of the cycle was required, and a decrease in heat efficiency occurred.

SUMMARY OF THE INVENTION

In order to solve the problem of the prior art described above, this invention uses for this entropyreduction phase a cycle which compresses at constant enthalpy by mechanical work without any accompanying generation of heat; in other words, without the need for the discharge of heat to a low-temperature heat source.

In other words, the heat engine utilizing a cycle having an isenthalpic pressure-increasing phase of this invention is characterized in that, in the entropyreduction phase of the cycle for changing the state of the working fluid, in order to have at least a part of that phase change at constant enthalpy, a compensating fluid (high-pressure feed) at a pressure higher than that of the cycle working fluid is introduced into the cycle system at the beginning of the isenthalpic change, thus increasing the pressure of the working fluid, and then the entropy of the working fluid is reduced by discharging a part of the working fluid to the outside of the cycle system at the end of the isenthalpic change.

BRIEF DESCRIPTION OF THE DRAWINGS

The invention will be better understood from the following detailed description taken in conjunction with the accompanying figures of the drawings, wherein.

DETAILED DESCRIPTION

Figure 1:
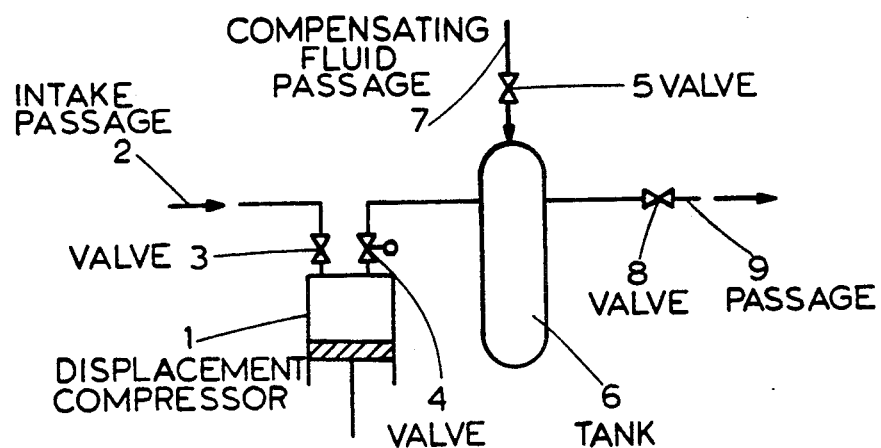
FIG. 1 is a system diagram showing the theoretical composition of the isenthalpic pressureincreasing apparatus of the heat engine of this invention.

When the piston of the displacement compressor 1 descends from the top dead center point and reaches the bottom dead center point, intake fluid at the low pressure $P_1$ in a volume equal to the displacement volume $V_1$ of the cylinder is taken into the system through the intake passage 2 via the valve 3. Next, approximately simultaneously with the closing of the valve 3, the valves 4 and 5 open, and working fluid at the high pressure $P_2$ inside the tank 6 is introduced into the cylinder. Through this operation, the intake fluid inside the cylinder is compressed and the pressure increases, and the volume taken up by this fluid decreases. Because in this state the pressure inside the tank 6 decreases, in order to compensate for this decreased volume, high-pressure compensating fluid (hereafter sometimes referred to as high-pressure feed) is at the same time supplied through the compensating fluid passage 7 to the tank 6 at approximately the same temperature and pressure $P_2$ as the fluid inside the tank.

Figure 2:
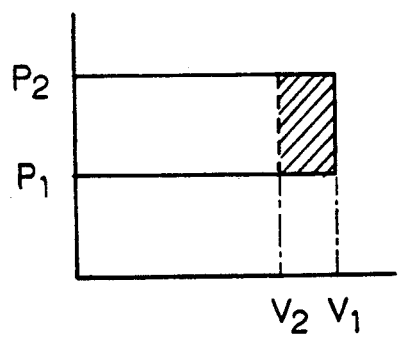
FIG. 2 is a P-V graph for the inside of the cylinder of the displacement compressor of the apparatus.

The conditions inside the cylinder during this changing process can be explained based on the P-V graph in FIG. 2 as a process whereby the pressure of the intake fluid is constant at $P_1$ and the volume increases to $V_1$ and then, through the opening of the valve 4, the volume remains constant and the pressure rises to $P_2$. If the volume inside the cylinder taken up by the intake fluid is $V_2$, the volume taken up by the compensating fluid corresponds to $V_1-V_2$. If the working fluid (formed by the intake fluid and the compensating fluid) is a real gas, the higher the pressure and the lower the temperature, the smaller the required volume ratio of compensating fluid, $(V_1-V_2)/V_1$. For example, if argon gas at a temperature of 132 K is increased in pressure from 500 $kg/cm^2$ to 1,000 $kg/cm^2$, the required volume ratio would be approximately 13%.

Next, with the valve 4 open and the pressure constant at $P_2$, the piston rises to the top dead center point, working fluid of $P_2$ and $V_1$ equivalent to the displacement of the piston is sent into the tank, and, at the same time, an identical volume of fluid is discharged from the valve 8 via the passage 9 to the outside of the system, thus completing the pressureincreasing process.

Now, if n is the number of molecules of the working fluid and m is the mass of one of these molecules, the mass of the intake fluid is $n_1$ m, the mass of the compensating fluid is $n_2$ m, and the mass of the discharge working fluid is $n_3$ m, and, because the temperature of the fluid discharged from the cylinder and that of the fluid inside the tank are approximately the same, $n_1 m + n_2 m = n_3 m$, and thus $n_1 + n_2 = n_3$.

In other words, because a volume equivalent to the total number of molecules of the intake fluid and compensating fluid contained in the system is discharged by the displacement action of the piston, the mass intake/output flowing in and out of the system is the same before and after the change.

A description of the operation of this invention based on a study of the heat intake/output is as follows.

Because the cycle process is an adiabatic process in which there is no heat flowing in from or out to the outside, and also because a displacement type compressor 1 is used, kinetic energy can be ignored.

After the intake fluid from the intake passage 2 is taken in by the displacement compressor 1, the change which occurs at the point at which the valve 3 closes and the valve 4 opens is as follows.

If the enthalpy of the intake fluid is $i_1$, $$i_1 = U_1 + A\, P_1 V_1 \ldots \quad (1)$$

Where, $U_1$: Internal energy contained in the intake fluid
A: Thermal equivalent of the work, 1/427 (Kcal/kgm)
$P_1$: Pressure of the intake fluid inside the compressor cylinder
$V_1$: Volume inside the compressor cylinder By differentiating Equation (1), $$di_1 = dU_1 + A\, P_1 dV_1 + A\, V_1 dP_1 \ldots \quad (2)$$

From the fundamental formula of thermodynamics, the amount of heat dq applied to the fluid by the changing process is:

$$d_q = dU_1 + A\, P_1 dV_1 \ldots \quad (3)$$

Because the changing process is an adiabatic process, dq = 0, and by substituting Equation (3) into Equation (2), $$di_1 = A\, V_1 dP_1 \ldots \quad (4)$$

When Equation (4) is integrated from pressures $P_1$ to $P_2$, $$\Delta i_1 = A \int_{P_1}^{P_2} V_1\, dP_1 = i_2 - i_1 \quad (5)$$

This $\Delta i_1$ indicates the amount of change in enthalpy which is generated by the above process. Because it is an adiabatic process, and also because there is no mechanical work from the outside, this amount of change corresponds to the enthalpy $i_f$ of the compensating fluid (high-pressure feed) which flowed into the cylinder.

$$\Delta i_1 = i_f = U_f + A\, P_2 V_f \ldots \quad (6)$$

Where, $U_f$: Internal energy contained in the compensating fluid
$P_2$ Pressure of the compensating fluid
$V_f$: Volume of the compensating fluid In other words, the amount of change $\Delta i_1$ of the apparent enthalpy of the intake fluid is equivalent to the total enthalpy of the compensating fluid flowing into the system.

Next, from Equation (5), the enthalpy $i_3$ of the working fluid at the time that the piston reaches the top dead center point is:

$$i_3' = i_2 + i_w = i_1 + \Delta i_1 + i_w \ldots \quad (7)$$

$i_w$ is the amount of work which the compressor 1 applies to the working fluid.

$$i_w = A\, P_2 V_1 - A\, P_1 V_1 \ldots \quad (8)$$

Thus, the following Equation (9) can be obtained from Equation (7).

$$i_3' = U_1 + A\, P_1 V_1 + U_f + A\, P_2 V_f + A\, P_2 V - A\, P_1 V_1 \ldots \quad (9)$$

Here, if the enthalpy of the working fluid discharged through the passage (9) in FIG. 1 is $i_3$, $i_3 = U_3 + A\, P_2 V_3$, and because $V_3 \approx V_1$, $$i_3 = U_3 + A\, P_2 V_1 \ldots \quad (10)$$

Here, when the intake/output of enthalpy into and out of the system is considered, because that sum must be zero, if the enthalpy entering the system is assumed to be positive and that leaving it to be negative, and if the amount of heat entering the system is $\Delta Q$, $$i_i + i_f + i_w - i_3 + \Delta Q = 0 \ldots \quad (11)$$

When Equations (1), (6), (8), and (10) are substituted into Equation (11) and, because this is an adiabatic process, if $\Delta Q$ is assumed to be zero, $$U_3 = U_1 + U_f + A\, P_2 V_f \ldots \quad (12)$$

When the above Equation (12) is substituted into Equation (10), $$i_3 = U_1 + A\, P_1 V_1 + U_f + A\, P_2 V + A\, P_2 V_1 - A\, P_1 V_1 \ldots \quad (13)$$

In Equation (13), $i_3$ indicates the enthalpy of the working fluid discharged to the outside of the system from the isenthalpic pressure-increasing apparatus of this invention. Here, looking at the right side of Equation (13), $U_f + A\, P_2 V_f$ is the enthalpy of the compensating fluid which enters the system, and it can be seen from Equation (13) that, through the changing process, this enthalpy remains constant. In addition, $A\, P_2 V_1 - A\, P_1 V_1$ indicates the amount of work generated by the compressor 1, and because, from the fundamental formula of thermodynamics (refer to Equation (4)), each of the pressures remains constant during the processes of the intake and compression operations, di = 0 and there is no change exerted on the enthalpy of the working fluid. Thus, the remaining $U_1 + A\, P_1 V_1$ is the enthalpy of the intake fluid flowing into the system, and it too must remain constant throughout the changing process. This verifies that the working fluid taken into the system is isenthalpic and that the pressure changes from $P_1$ to $P_2$.

Here, concerning the temperature after the change, from the fundamental formula of thermodynamics, $$d_q = d_i - A\, v\, dp \ldots \quad (14)$$

Here, if q is the amount of heat applied from the outside, i is the enthalpy, p is the pressure, v is the specific volume, A is the thermal equivalent of the work, and T is the absolute temperature of the fluid, then, from the definition of the entropy s, dq = T ds, and because in this invention, as described above, the fluid which enters the system from the intake passage 2 is isenthalpic and the entropy is reduced, if ds is assumed to be negative, $$d_q = -T\, ds \ldots \quad (15)$$

When the above Equation (15) is substituted into Equation (14), $$T\, ds = -di + A\, v\, dp$$

$$ds = \frac{A\,v}{T} dp - \frac{di}{T} \qquad (16)$$

If $i = f_1(p, T)$ is assumed, $$di = \left(\frac{\partial i}{\partial p}\right)_T dp + \left(\frac{\partial i}{\partial T}\right)_p dT \qquad (17)$$

Substituting this into Equation (16), $$ds = \frac{A\,v}{T} dp - \frac{1}{T}\left\{\left(\frac{\partial i}{\partial p}\right)_T dp + \left(\frac{\partial i}{\partial T}\right)_p dT\right\}$$

$$= \frac{A\,v}{T} dp - \left(\frac{\partial i}{\partial p}\right)_T \frac{dp}{T} - \left(\frac{\partial i}{\partial T}\right)_p \frac{dT}{T}$$

$$= \frac{1}{T}\left\{A\,v - \left(\frac{\partial i}{\partial p}\right)_T\right\} dp - \left(\frac{\partial i}{\partial T}\right)_p \frac{dT}{T}$$

In addition, if $s = f_2(p, T)$ is assumed, $$ds = \left(\frac{\partial s}{\partial T}\right)_p dT + \left(\frac{\partial s}{\partial p}\right)_T dp \qquad (18)$$

Comparing these two equations, $$-\frac{1}{T}\left(\frac{\partial i}{\partial T}\right)_p = \left(\frac{\partial s}{\partial T}\right)_p \qquad (19)$$

$$\left(\frac{\partial s}{\partial p}\right)_T = \frac{1}{T}\left\{A\,v - \left(\frac{\partial i}{\partial p}\right)_T\right\} \qquad (20)$$

From Equation (19), $$\frac{1}{T}\left(\frac{\partial^2 i}{\partial T \partial p}\right) = \left(\frac{\partial^2 s}{\partial T \partial p}\right) \qquad (19')$$

And, from Equation (20), $$\frac{\partial^2 s}{\partial p\, \partial T} = \frac{1}{T}\left\{A\left(\frac{\partial v}{\partial T}\right)_p - \frac{\partial^2 i}{\partial p\, \partial T}\right\} - \frac{1}{T^2}$$

$$\left\{A\,v - \left(\frac{\partial i}{\partial p}\right)_T\right\} \qquad (21)$$

Based on the assumption that Equations (19') and (21) are equivalent, $$-\frac{1}{T}\left(\frac{\partial^2 i}{\partial T \partial p}\right) = \frac{A}{T}\left(\frac{\partial v}{\partial T}\right)_p - \frac{\partial^2 i}{\partial p\, \partial T}\cdot \frac{1}{T} -$$

$$\frac{1}{T^2}\left\{A\,v - \left(\frac{\partial i}{\partial p}\right)_T\right\}$$

$$\therefore \frac{A}{T}\left(\frac{\partial v}{\partial T}\right)_p = \frac{1}{T^2}\left\{A\,v - \left(\frac{\partial i}{\partial p}\right)_T\right\}$$

$$A\,T\left(\frac{\partial v}{\partial T}\right)_p = A\,v - \left(\frac{\partial i}{\partial p}\right)_T$$

-continued $$\therefore \left(\frac{\partial i}{\partial p}\right)_T = A\,v - A\,T\left(\frac{\partial v}{\partial T}\right)_p \qquad (22)$$

In addition, from the fundamental formula of thermodynamics, the specific heat $C_p$ at a constant pressure is:

$$C_p = \left(\frac{\partial i}{\partial T}\right)_p \qquad (23)$$

By substituting Equations (22) and (23) into Equation (17).

$$di = C_p\,dT + \left\{A\,v - A\,T\left(\frac{\partial v}{\partial T}\right)_p\right\} dp$$

Because it is an isenthalpic change, $di = 0$, and thus, $$\left(\frac{\partial T}{\partial p}\right)_i = \frac{A}{C_p}\left\{T\left(\frac{\partial v}{\partial T}\right)_p - v\right\} = \qquad (24)$$

$$\frac{A\,T^2}{C_p}\left(\frac{\partial (v/T)}{\partial T}\right)_p$$

From Equation (24), and because $$\left(\frac{\partial v}{\partial T}\right)_p \begin{matrix}<\\=\\>\end{matrix} \frac{v}{T}$$

the temperature following the isenthalpic change changes as follows:

$$\left(\frac{\partial T}{\partial p}\right)_i \begin{matrix}<\\=\\>\end{matrix} 0$$

An explanation of this one example based on the $T_s$ graph is as follows.

Figure 3:
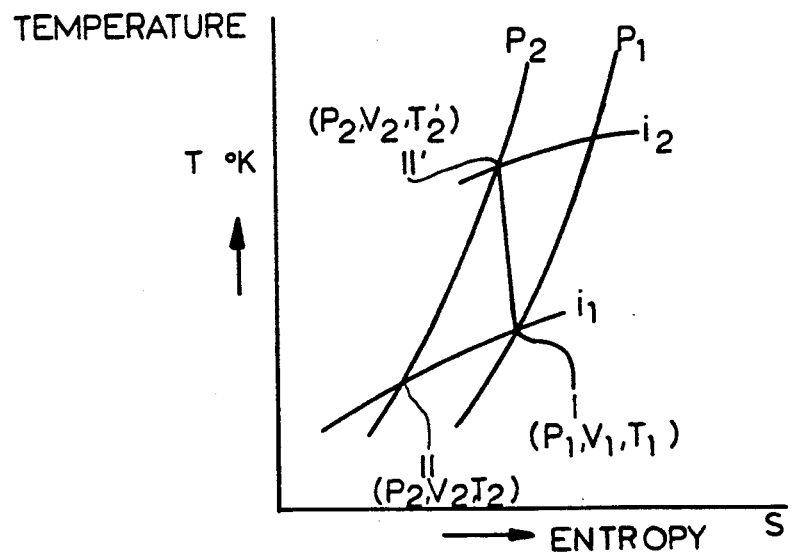
FIG. 3 is an enlargement of a part of the high-pressure, low-temperature section of the $T_s$ graph for argon gas, which is the working fluid.

FIG. 3 is a sketch of the $T_s$ graph of the range in which the temperature rises as a result of the Joule-Thomson effect. As explained above, with the isenthalpic pressure-increasing apparatus of this invention, the intake fluid at point (I) which has been taken in from the passage 2 is compressed at constant enthalpy $i_1$, reaches point (II), and the pressure increases from $P_1$ to $P_2$. In this case, because there is an isenthalpic change in the reverse direction of the Joule-Thomson effect, the temperature decreases from $T_1$ to $T_2$. This temperature decrease functions as a low-temperature source which primarily maintains the temperature of the low-temperature side of a clockwise cycle.

For comparison, the following is a similar analysis of the cycle according to the prior art. In the standard adiabatic compression process, the intake working fluid at point (I) is compressed by the piston inside the cylinder until it reaches the pressure $P_2$, and then the valve 4 opens and the fluid is discharged. Thus: although Equation (1) is the same as described above, because there is no introduction of compensating fluid from outside the system, Equation (6) is not applicable, and the equation corresponding to Equation (10) is as follows:

$$i_3 = U_3 + A P_2 V_2' \ldots \quad (25)$$

Where,
$V_2'$: Fluid volume after adiabatic compression
Because the operation of the compressor is adiabatic isentropic compression, $$i_w = \frac{A P_1 V_1}{k-1}\left\{\left(\frac{P_2}{P_1}\right)^{\frac{k-1}{k}} - 1\right\} + A P_2 V_2' - A P_1 V_1 \quad (26)$$

Where,
k: Ratio of specific heat, Cp/Cv
Because the enthalpy of the fluid entering the system which is the same as that of the fluid leaving the system, $$i_1 + i_2 = i_3 \ldots \quad (27)$$

If equation (1), (25) and (26) are substituted into Equation (27) and the kinetic energy is ignored in the same way as described earlier, $$U_1 + A P_1 V_1 + \frac{A P_1 V_1}{k-1}\left\{\left(\frac{P_2}{P_1}\right)^{\frac{k-1}{k}} - 1\right\} +$$

$$A P_2 V_2' - A P_1 V_1 = U_3 + A P_2 V_2' \quad (28)$$

$$U_3 - U_1 + \frac{A P_1 V_1}{k-1}\left\{\left(\frac{P_2}{P_1}\right)^{\frac{k-1}{k}} - 1\right\}$$

If equation (28) is substituted into Equation (25) and the kinetic energy is ignored, $$i_3 + U_1 + \frac{A P_1 V_1}{k-1}\left\{\left(\frac{P_2}{P_1}\right)^{\frac{k-1}{k}} - 1\right\} + A P_2 V_2' \quad (29)$$

From Equation (29), the enthalpy of the fluid discharged from the system is the sum of the internal energy of the intake fluid, the amount of work of the adiabatic isentropic compression performed by the compressor, and the amount of work of discharging the working fluid after compression. However, this work of the adiabatic isentropic compression is converted into heat, thus causing the enthalpy of the intake fluid to increase. This process is indicated by the shift from point (I) to point (II') in FIG. 3, with the temperature of the fluid increasing from $T_1$ to $T_2'$ and the enthalpy increasing from $i_1$ to $i_2'$.

Thus, in order to remove the heat corresponding to this enthalpy increase $i_2'i_1$ to the outside of the system, a low-temperature heat source with a temperature lower than $T_1$ was required with the prior art, but not with the isenthalpic pressure-increasing apparatus of this invention.

Figure 4:
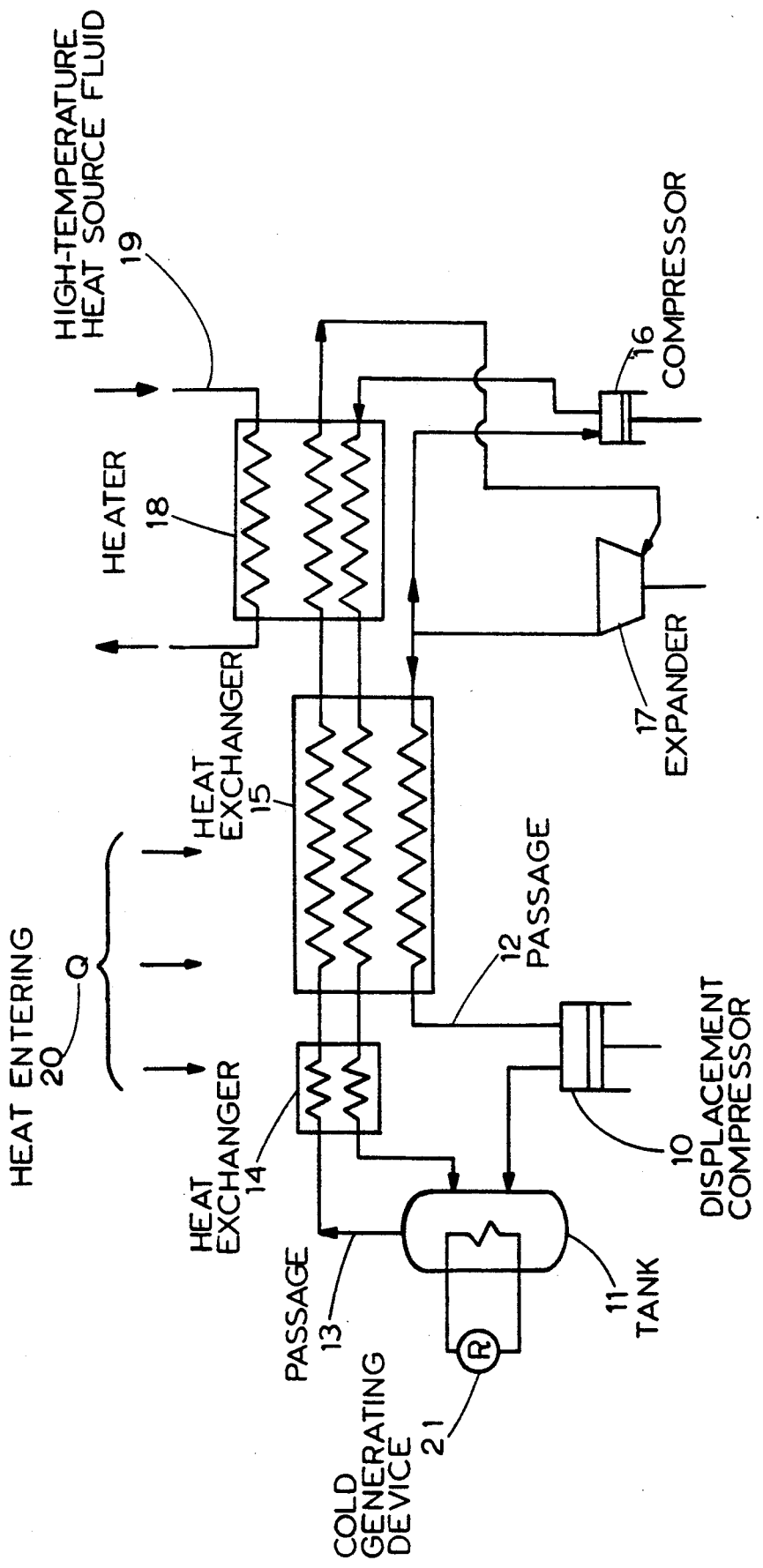
FIG. 4 is a system diagram showing a preferred embodiment of the invention.
Figure 5:
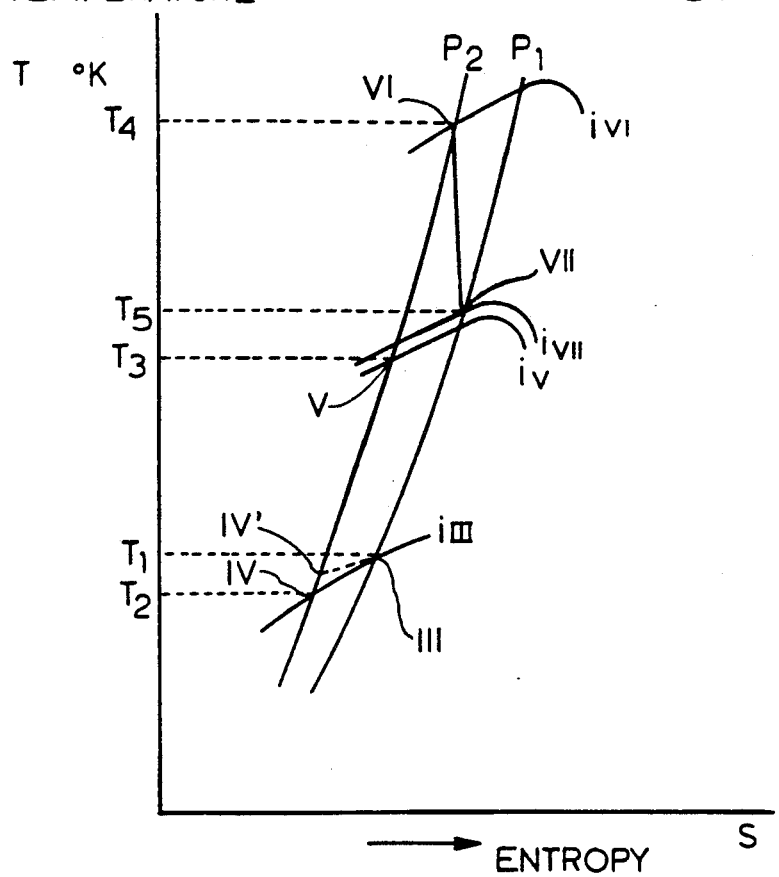
FIG. 5 shows a $T_s$ graph for the cycle process.
Figure 6:
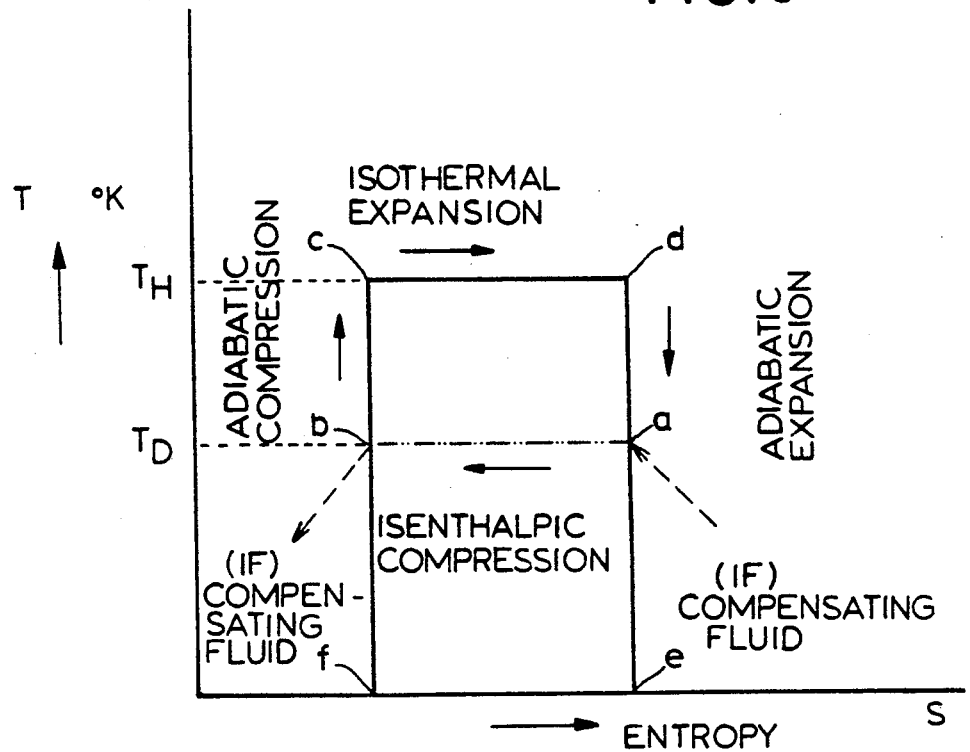
FIG. 6 is the basic cycle diagram.

The following is a more detailed explanation of an embodiment of a heat engine according to this invention, utilizing a cycle having an isenthalpic pressure-increasing process. FIG. 4 is a system diagram of one embodiment of the heat engine according to this invention. A displacement compressor 10 and a tank 11 comprise the essential elements of the isenthalpic pressure-increasing apparatus of this invention. FIG. 5 shows the $T_s$ graph for the cycle process and FIG. 6 is the basic cycle diagram.

In the system diagram in FIG. 4, as will be explained later, the pressure of the intake fluid taken into the displacement compressor 10 from the passage 12 is increased at constant enthalpy by the high-pressure compensating fluid which is introduced via the tank 11 and the temperature decreases. The rising of the piston of the compressor 10 causes the working fluid to be sent to the tank 11, and an equal amount of fluid flows from the tank 11 into the passage 13. This process is indicated by the shift from point (III) to point (IV) in the $T_s$ graph in FIG. 5.

The high-pressure compensating fluid which enters the passage 13 passes through heat exchangers 14 and 15, and undergoes heat exchange with the fluid coming from a compressor 16 and an expander 17 so that its temperature increases at a constant pressure. The compensating fluid then passes through a heater 18, where the temperature is further increased by a high-temperature heat source fluid 19 from outside the system, and finally it reaches the expander 17. This process is indicated by points (IV), (V), and (VI) in FIG. 5.

This high-pressure, high-temperature working fluid performs mechanical work outside the system in the expander 17, and the working fluid itself decreases in pressure and temperature, passes through the heat exchanger 15, undergoes heat exchange with the working fluid from the passage 13, the temperature decreases further, and this fluid is taken into the displacement compressor 10. This process is indicated in FIG. 5 by points (VI) and (VII) and points (VII) and (III).

Meanwhile, the compensating fluid needed for the isenthalpic pressure increase is guided from the outlet side of the expander 17 to the compressor 16, where it is compressed at constant entropy, the pressure and temperature increase, and then the fluid is guided to the heater 18. This process is indicated by the shift from point (VII) to point (VI) in FIG. 5. Next, by passing through the heater 18, the heat exchanger 15, and the heat exchanger 14, this fluid is cooled to approximately the same temperature as the working fluid inside the tank 11, it enters the tank 11 as the compensating fluid, and it also enters the displacement compressor 10. The piston of the compressor 16 rises slightly earlier than the piston of the displacement compressor 10, performing one compression per cycle and functioning to move the compensating fluid.

The increase in enthalpy which accompanies this adiabatic compression is absorbed in the heater 18 by the working fluid from the low-temperature side and recovered as the mechanical work of the expander 17. In addition, although the compensating fluid which flows into the tank 11 is cooled by the heat exchangers 15 and 14 before it enters the tank, because there are aberrations in the heat exchange, the temperature is slightly higher than that of the fluid inside the tank, thus causing enthalpy to be brought in, and in the actual cycle, point (IV) moves to point (IV') in FIG. 5.

Because there is an increase in the enthalpy of the low-temperature range caused by the heat which accompanies the loss in the heat exchanger and the heat 20 entering from the outside, the tank 11 is provided with a refrigeration unit or a cold generating device 21 in order to compensate for this increase.

Concerning the cycle of the embodiment shown in FIGS. 4 and 5, examination of the entropy-reduction process on the low-temperature side shows that the entropy of the low-temperature side is reduced by means of the compensating fluid which flows into and out of the isenthalpic pressure-increasing apparatus at constant enthalpy. Although this compensating fluid is compressed at constant entropy by the compressor 16 at the beginning of the cycle so that its enthalpy increases, because the increased enthalpy is recovered as mechanical work by the expander 17 at the final process of the cycle, the increase and decrease in enthalpy during the cycle is theoretically zero. Next, of the work of the displacement compressor 10, although (A $P_2V_2$ − A $P_1 V_2$) is removed to the outside as mechanical work by the expander 17, the amount of work A($P_2 - P_1$) ($V_1 - V_2$) which corresponds to the shaded area in FIG. 2 is not removed to the outside as mechanical work, but consumed in the process of the cycle. In other words, the entropy of the working fluid is reduced by this mechanical work.

Generally, according to common knowledge of the Carnot cycle, the heat efficiency of the cycle is:

$$\eta c = 1 - \frac{T_0}{T_H} \quad (30)$$

Where,
$T_H$: Maximum temperature (° K) of the cycle
$T_0$: Minimum temperature (° K) of the cycle From the above equation, it can be seen that the lower $T_0$ is, the closer $\eta$ c will be to 1, and the better the heat efficiency of the cycle will be.

With this relationship, a comparison of the advantages and disadvantages of this invention and the prior art is as follows. With the prior art, as a means of reducing the temperature of the low-temperature side of the cycle, there are such methods as utilizing surplus cold, such as that of a liquefied gas. However, because there are special conditions involved, such as for obtaining liquefied gas and processing vaporized gas, and also because of the limited thermal capacity of such methods, their use is accompanied by many limitations. In the present situation, for the cycles currently being widely used for industrial purposes, natural conditions such as ambient air, natural water, etc., are utilized as a low-temperature heat source, focus is being given to the development of the equipment composing the cycle and the materials used in efforts to increase the high-temperature side, i.e. $T_H$, as high as possible, and efforts are being made to add a cycle for efficiently recovering the exhaust heat or to improve methods of utilizing that exhaust heat.

Although generally the basics of the process of reducing the entropy in the cycle are isothermal compression and the discharge to the low-temperature heat source of the heat which accompanies that compression, because isothermal compression is technologically difficult in an actual closed cycle, isobaric change and adiabatic compression are combined, in other words, the working fluid is adiabaticaily compressed at constant entropy and the heat is discharged to the lowtemperature heat source at a constant pressure.

In contrast, with this invention, as already described, the entropy of the working fluid is reduced at constant enthalpy by mechanical work without discharging any heat to the low-temperature side. Thus, it is possible to have the cycle operate in accordance with the characteristics of the working fluid across an appropriate temperature range below the natural temperature. Taking only the temperature into consideration, it is possible to set the $T_0$ in Equation (30) to an appropriate temperature below the natural temperature, and, if the high-temperature side of the cycle is the same, it is possible for $\eta$ c to be closer to 1, thus improving the heat efficiency of the cycle.

The following is an explanation of the operation of the cycle of this invention considering the operation of the piston inside a single cylinder in the same way as the operation of the Carnot cycle was considered using an ideal gas as the working fluid in order to determine the theoretical heat efficiency of the cycle of this invention.

In the theoretical cycle shown in FIG. 6, at point (a), a working fluid of pressure $P_1$ and temperature $T_0$ is held inside the cylinder. The intake valve of the cylinder opens, compensating fluid (enthalpy $i_f$, pressure $P_2$) flow is introduced into the cylinder from outside the system (outside the cylinder), this causes the working fluid inside the cylinder to be compressed at constant enthalpy until it reaches $P_2$ and reaches point (b), and the intake valve closes. Because it is an ideal gas, from P V = R T (R: gas constant), V/T = R/P and, under constant pressure, V/T will be constant. Thus, from Equation (24), the right side of the equation is zero, ($\delta T/\delta p$) i=0, and a change at constant enthalpy will have a constant temperature. In other words, because the process from point (a) to point (b) is an isenthalpic change, the temperature remains $T_0$ and does not change. Next, at point (b), first, still at pressure $P_2$, working fluid equivalent to the enthalpy ($i_f$) of the compensating fluid is discharged to the outside of the system (the outside of the cylinder) by the displacement action of the piston. Although the discharge valve to the outside of the system closes simultaneous with the completion of this discharge, the piston continues to move upward, adiabatically compressing the working fluid remaining inside the cylinder at constant entropy to point (c) so that the pressure changes to $P_3$ and the temperature changes to $T_H$. Next, with the valve closed, while heat is absorbed from the outside and mechanical work is performed, isothermal expansion occurs and point (d) is reached. As a result, the exchange of heat with the outside is shut off, adiabatic isentropic expansion is performed up to point (a), the pressure and the temperature become P1 and $T_0$, respectively, returning to the original conditions, and the cycle ends. In this process, because the enthalpy ($i_f$) is the same for both the compensating fluid which enters the system and that which leaves the system, the sum of the two is zero. However, mechanical work is needed for the compensating fluid to be discharged to the outside of the system by the piston at point (b), and this is work consumed by the entropyreduction process.

The amount of heat applied to the cycle is the area enclosed by points (f), (c), (d), and (e) in FIG. 6, and this is designated $Q_H$. Meanwhile, if the work consumed in the isenthalpic process from point (a) to point (b) is designated W, the corresponding amount of heat is A W. Thus, the theoretical heat efficiency $\eta$ of the cycle is:

$$\eta = \frac{Q_H - A W}{Q_H} = 1 - \frac{A W}{Q_H} \quad (34)$$

In comparison to the discharge of heat to the low-temperature side required in the entropy-reduction process (isothermal compression process) of the Carnot cycle, the reduction of entropy simply by the mechanical work A W as described above is the characteristic feature of this invention. With a real gas working fluid, the lower the temperature and the higher the pressure of the low-temperature side, the smaller the volume of the compensating fluid. Also, the higher the temperature of the high-temperature side of the cycle, the smaller the ratio of A W to the amount of heat applied to the cycle. Thus, it is possible for $\eta$ to approach 1 and improve the heat efficiency of the cycle.

Now, if actual argon gas is used as the working fluid and the values taken from the $T_s$ graph for argon gas are plotted on the cycle shown in FIG. 5 in order to determine the theoretical heat efficiency of an embodiment of a heat engine running the cycle in FIG. 5, the results are as follows.

Assuming the following conditions:
Temperature $T_4$ at point (VI) = 500 K
Entropy $S_{vI}$ = 105.5 joule/mol °K
Entropy $S_v$ at point (V) = 98 joule/mol °K
Temperature $T_1$ at point (III) = 132 K
Argon gas volume $V_1$ = 30.5 cm$^3$/mol
Temperature $T_2$ at point (IV) = 115 K
Argon gas volume $V_2$ = 26.5 cm$^3$/mol
$P_1$ = 516 kg/cm$^2$
$P_2$ = 1,033 kg/cm$^2$ Because under the above conditions the cycle receives heat from the high-temperature side during the process from point (V) to point (VI), in Equation (34), $Q_H = T_4(S_{VI} - S_v) = 3,750$ joule/mol and A W = $A(P_2 - P_1)(V_1 - V_2) = 202.5$ joule/mol. Thus, by substituting these values into Equation (34), $\eta \approx 0.94$, i.e. 94% is the theoretical heat efficiency of this heat engine.

In comparison to the theoretical heat efficiency of 64% for when the Rankine cycle currently used by steam power plants is performed in the Carnot cycle, with this invention it is possible to obtain a theoretical heat efficiency of 94% as described above.

In addition, by setting the high-temperature side of the cycle to an appropriate temperature below 0° C., it is possible to utilize this invention as a cold generating device.

What is claimed is:

1. A method of generating power comprising:
   (a) directing a working fluid through a series of heat exchange steps to increase the temperature and pressure of the fluid;
   (b) expanding the thus high temperature, high pressure working fluid to produce a work output and an exhaust working stream;
   (c) splitting the exhaust working stream into first and second flow streams;
   (d) directing the first flow stream serially through at least one heat exchange zone, a compression zone, and a mixing zone;
   (e) directing the second flow stream serially through a compression zone, at least one heat exchange zone, and said mixing zone;
   (f) withdrawing fluid from said mixing zone as working fluid, and cyclically repeating the steps (a)-(e).

* * * * *